(12) United States Patent
Bush et al.

(10) Patent No.: US 7,637,651 B2
(45) Date of Patent: Dec. 29, 2009

(54) PROCESS FOR MAKING SLURRIES

(75) Inventors: John W. Bush, Pottstown, PA (US); I. Midey Chang-Mateu, Ambler, PA (US)

(73) Assignee: Rohm and Haas Company, Philadelphia, PA (US)

(*) Notice: Subject to any disclaimer, the term of this patent is extended or adjusted under 35 U.S.C. 154(b) by 637 days.

(21) Appl. No.: 11/451,783

(22) Filed: Jun. 13, 2006

(65) Prior Publication Data

US 2007/0008812 A1 Jan. 11, 2007

Related U.S. Application Data

(60) Provisional application No. 60/697,194, filed on Jul. 7, 2005.

(51) Int. Cl.
*B01F 13/10* (2006.01)
(52) U.S. Cl. .................................................. 366/136
(58) Field of Classification Search ................. 366/136, 366/137
See application file for complete search history.

(56) References Cited

U.S. PATENT DOCUMENTS

| | | | | |
|---|---|---|---|---|
| 1,781,435 | A | * | 11/1930 | Carper ........................ 241/97 |
| 3,298,618 | A | | 1/1967 | Talpey |
| 4,509,987 | A | | 4/1985 | Farrar et al. |
| 4,833,897 | A | * | 5/1989 | Burns ........................... 62/330 |
| 5,118,349 | A | | 6/1992 | Jalon et al. |
| 5,667,012 | A | | 9/1997 | Hoover et al. |
| 5,746,822 | A | | 5/1998 | Espinoza et al. |
| 5,966,456 | A | | 10/1999 | Jones et al. |
| 6,402,824 | B1 | | 6/2002 | Freeman et al. |
| 2002/0149003 | A1 | | 10/2002 | Lucht et al. |
| 2003/0021998 | A1 | | 1/2003 | Hubbard et al. |
| 2006/0016922 | A1 | | 1/2006 | Klaumunzner |
| 2006/0233042 | A1 | | 10/2006 | Buchholz et al. |
| 2007/0025178 | A1 | | 2/2007 | Kao et al. |

FOREIGN PATENT DOCUMENTS

| | | |
|---|---|---|
| EP | 0 108 842 B1 | 3/1987 |
| EP | 0284929 A1 | 10/1988 |
| EP | 0608078 A | 7/1994 |
| EP | 0 129 329 B2 | 4/1998 |
| EP | 0 681 998 B1 | 6/1998 |

OTHER PUBLICATIONS

Kevin J. Myers, et al, "Optimize Mixing by Using the Proper Baffles," *CEP Magazine*, Feb. 2002, pp. 42-47.
European Search Report for Application No. 06252911.0, Mailed Aug. 31, 2007, 2 pages.
International Search Report for International Application No. PCT/US2004/038667, Mailed on Jun. 2, 2005, 4 pages.
Written Opinion for International Search Report for International Application No. PCT/US2004/038667, Mailed on Jun. 2, 2005, 7 pages.

* cited by examiner

*Primary Examiner*—David L Sorkin
(74) *Attorney, Agent, or Firm*—Kim R. Jessam; Cantor Colburn LLP

(57) ABSTRACT

A process for making slurries is provided. The process comprises providing a liquid component and a solids component; introducing the liquid component into a mixing vessel having pitched blade turbines; adding at least 25% of the solids component into the mixing vessel; initiating an in-line rotor stator positioned to receive the mixture from the mixing vessel; and re-circulating the mixture from the mixing vessel through the in-line rotor stator and back to the mixing vessel.

10 Claims, 1 Drawing Sheet

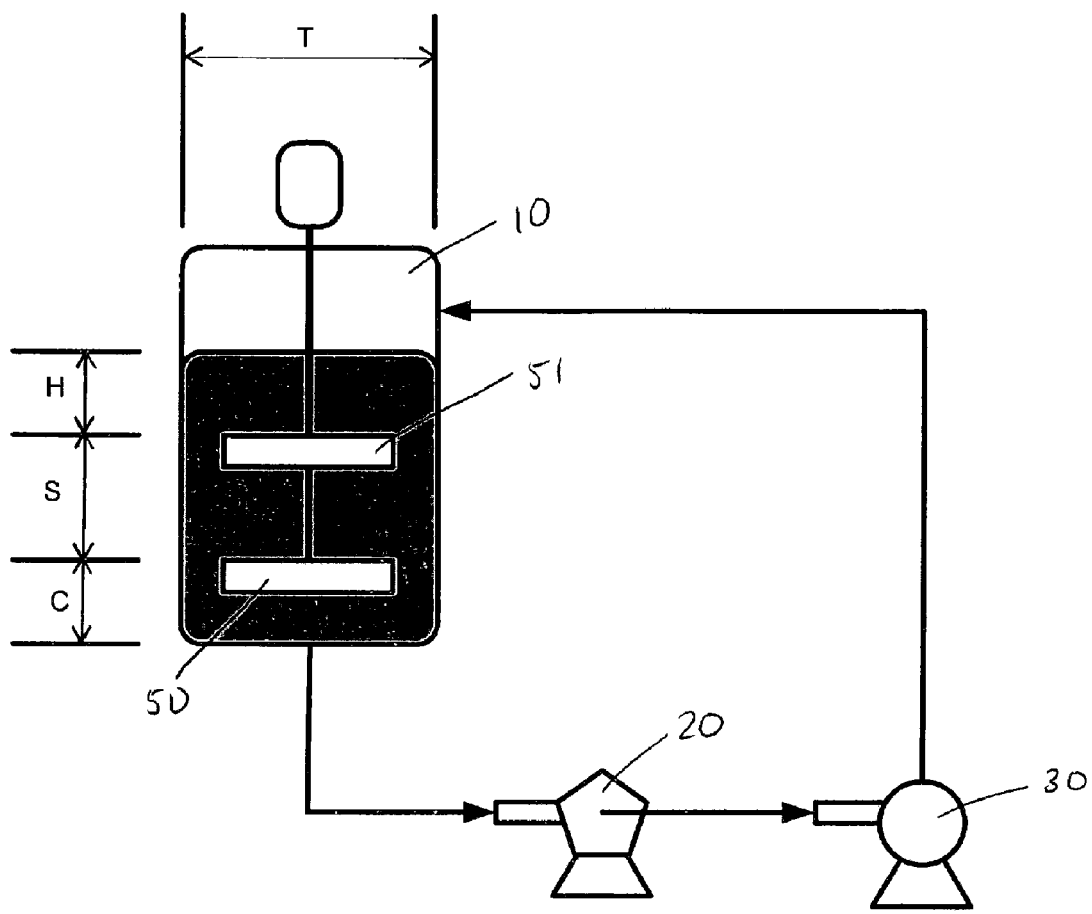

PROCESS FOR MAKING SLURRIES

This non-provisional patent application claims priority based on prior pending Provisional Patent Application No. 60/697,194, filed Jul. 7, 2005, the disclosure of which is incorporated herein by reference.

The invention relates to methods of making slurries. Particular applicability can be found in making composite products having insoluble solids.

Several processes for making slurries have been disclosed. A typical process for making slurries containing solids, i.e., paint and mineral slurries, involves a Cowles blade. For example, in U.S. Pat. No. 4,686,252, a dispersion realized in a high speed mixer (dissolver/Cowles blade) is described.

Motor size, temperature control, and flow pattern are equipment-related issues often associated with a commercial scale Cowles process. When employing Cowles blades in making slurries, larger scale production, for example, 20 ton production, requires larger diameter blades to maintain a desired particle size. In addition, a slower agitation speed is necessary to achieve the same tip speed as in a small scale Cowles process, for example, 1 ton production. The slower agitation speed in the large scale production creates a poor flow pattern for pulling solids off the surface of the slurry. To overcome these problems, longer mixing times are needed causing the temperature of the product to increase, and thus, a mixing vessel with a cooling jacket is required. The motor size requirements for the large scale Cowles are also costly.

One method to improve flow pattern for either a large or small scale Cowles blade process is to change the position of the blade, i.e., lifting the blade from the bottom of the mixing vessel. However, this is not always economically practical for a large scale Cowles process.

After production, one problem that occurs with slurries containing solids is settling over time. Typically, the settling results in a hard packed cake at the bottom of a storage container that is difficult to re-disperse without extensive mechanical agitation. It is advantageous for these slurries to have a shelf life of at least 12 months. Consequently, the hard packed cake is an unacceptable defect if it occurs prior to the expiration of the 12-month shelf life.

This invention provides a process for making a mixture comprising providing a liquid component and a solids component; introducing the liquid component into a mixing vessel having pitched blade turbines positioned inside the mixing vessel according to the following ratios:

| | |
|---|---|
| D/T | 0.45-0.55, |
| C/T | 0.07-0.35, |
| S/T | 0.18-0.47, and |
| H/T | 0.09-0.65; | adding at least 25% of the solids component into the mixing vessel; initiating an in-line rotor stator positioned to receive the mixture from the mixing vessel; and re-circulating the mixture from the mixing vessel through the in-line rotor stator and back to the mixing vessel. The solids component has a specific gravity of 2.0-3.5 having particles with a diameter of 5-50 microns and the liquid component has particles comprising from 5-65% by weight based on the weight of the liquid component and a viscosity of 10-10,000 cps.

The process of the present invention may be used to make a variety of slurries. Exemplary slurries may be found in U.S. Pat. No. 5,746,822, U.S. Publication No. 2003/0105202 A1, U.S. Pat. No. 4,509,987, and EP129329. Preferably, the formulations of these slurries have a solids range of 65-85 wt %, more preferably, 75.0-85.0 wt %, and most preferably, 79.0-84.0 wt % based on the weight of the slurry/mixture. These formulations have viscosities, as measured by a Brookfield viscometer (Brookfield LV at 1.5 RPM with Spindle #4 at 25 C), of 10,000-200,000 cps, preferably in the 50,000-80,000 cps range. The particle size of the mixture ranges from 10-300 microns, preferably in the 50-60 micron range with a pH ranging from 3.0-9.5. The process of the invention is particularly useful with slurries having calcium sulfate hemihydrate or aluminum trihydrate particles.

As shown in FIG. 1, equipment used in the process includes an agitated mixing vessel 10 with or without a jacket for temperature control, a device for solids handling, and in-line rotor stator (mixer) 20, and a pump 30. In a preferred embodiment, the mixing vessel 10 includes two 4-bladed turbines with a 45 degree pitched blade 50 and 51, which discharge one half of the total flow of the mixture axially and one half of the total flow radially.

Exemplary devices for solids handling include a bag for manual addition and mechanical means, where solids addition typically ranges from 6-8 hours with a mechanical auger feed, but preferably ranges from 3-4 hours with a direct sack drop into the mixing vessel. The relationship of the solids feed rate to particle size is different for large and small scale processes. On the larger scale, i.e., 20 ton production, one may not be able to physically add the required amount of solids fast enough to impact particle size. However, for the smaller scale, i.e., 1 ton, shortcomings in blade positioning, such as position misplacement, and speed may be offset by controlling the solids addition rate.

The particle size for the desired settling performance may be maintained by use of the in-line rotor stator 20. The in-line rotor stator 20 includes a single or multi-stage rotor that turns within a stationary stator. As the rotating blades pass the stator, they mechanically shear the contents. The use of an in-line rotor stator 20, and preferably, a high shear rotor stator with concentrated shear zone, in conjunction with the mixing vessel 10 equipped with the 45 degree pitched blade turbines 50 and 51 helps to achieve a homogenous mixture resistant to settling. The 45 degree pitched blade turbines 50 and 51 promote axial flow that results in uniform distribution of the solids. In one embodiment, configuration of the in-line rotor stator 20 includes a slotted head rotor stator and a 0.25-25 horsepower (hp) (0.2-18.6 kW) motor, with a 10 hp (7.45 kW) motor being preferred. The speed range of the in-line rotor stator 20 ranges from 1,000 to 3,400 RPM with a preferred speed of 1,400 RPM. Exemplary in-line rotor-motors include that described in U.S. Pat. No. 6,241,472, HED 2000 homogenizer available from IKA® Works, Inc. (Wilmington, N.C.), and HSM 410 High Shear mixer available from Charles Ross & Son Company (Hauppauge, N.Y.).

Any suitable pump may be used in the process of the present invention. Preferably, the pump 30 and in-line rotor stator 20 are set up in a "pull" mode. "Pull" mode is defined by locating the re-circulation pump 30 down stream of the in-line rotor stator 20 such that it "pulls" or draws material from the bottom of the mixing vessel 10 and through the in-line rotor stator 20. Operating in "pull" mode facilitates the return of material back to the mixing vessel and prevents heat build-up and undesired particle size.

The process of the invention includes charging the mixing vessel 10 with a liquid component and then initiating an addition of a solids component. In one embodiment, some of the liquid component is added after some or all of the solid component is added. The solids component comprises any material or powder having an initial finite particle size of 5-50 microns, and preferably, 10-20 microns, with specific gravities of 2-3.5 and preferably, 2.4-2.5. Preferably, the solids component is supplied as a powder. If the solids are larger than 10-20 microns, they may first be grinded. During solids addition, preferably, the mixing vessel agitation is increased. After at least 25% of the solids component is added into the mixing vessel 10, the in-line rotor stator 20 is initiated. Preferably, 25-75% of the solids, and more preferably, 40-60% of the solids, is added before the in-line rotor stator 20 begins operation.

As shown in FIG. 1, the mixture is re-circulated from the mixing vessel 10 through the in-line rotor stator 20 and back to the mixing vessel 10. Re-circulation through the in-line rotor stator 20 is, preferably, established before solids addition resumes. Passing the entire mixing vessel contents once through the in line rotor stator 20 is defined as one turnover. In one embodiment, after all of the solids are fed, the re-circulation rate is increased through the inline rotor stator 20 and re-circulated during a hold period. The hold period is determined by the time required for one turnover. Re-circulation during the hold period helps to ascertain a complete homogenous mixture. In a preferred embodiment, after the hold period, re-circulation is terminated and the in-line rotor stator 20 is shut down. The mixture is then removed from the mixing vessel 10 and filtered. In one embodiment, the mixture may be packed out by filtering it, for example, through mesh screens.

The mixing vessel motor size, agitator speed and solids addition rate may contribute to achieving immediate wetting out of the solids after the solids are added to the batch; i.e., there is no residual powder floating on the surface of the slurry. However, an over-riding equipment parameter for the mixing vessel 10 is blade positioning. The blade positioning of the upper and lower impellers 51 and 50, respectively, is defined as ratios in terms of the mixing vessel diameter T. With reference to FIG. 1, these ratios are determined by D/T C/T, S/T and H/T, where D=pitched blade turbine diameter,
T=mixing vessel diameter,
C=clearance from the mixing vessel bottom to the lower pitched blade turbine,
H=submergence of the upper blade, and
S=distance between the upper and lower pitched blade turbines, all in the same units of length. The preferred ranges for these ratios are:

| | |
|---|---|
| D/T | 0.45-0.55 |
| C/T | 0.07-0.35 |
| S/T | 0.18-0.47 |
| H/T | 0.09-0.65 |

More preferred ranges for these aspect ratios are:

| | |
|---|---|
| D/T | 0.50-0.53 |
| C/T | 0.07-0.29 |
| S/T | 0.44-0.47 |
| H/T | 0.09-0.26 |

Additionally, other parameters may contribute to the operation of the process. Preferably, motor horse power, impeller position (aspect ratios), and speed adjustment of the pitched blade turbines are considered. There parameters are important in achieving the flow pattern required to pull in solids from the surface of slurry. In a preferred embodiment, motor requirements for the mixing vessel range from 10-15 hp (7.45-11.2 kW) per thousand gallons (3785 liters) with an optimal range of 11-13 hp (8.2-9.7 kW) per thousand gallons (3785 liters).

As stated above, solids addition rate is another parameter to consider. On the smaller scale, the solids addition rate may be used to offset low agitator speeds and blade positioning outside of the preferred ranges. This rate effects particle size and settling in that for a fixed agitation speed, a slower solids addition rate provides a smaller particles size. Faster solids additions provide larger broader particle size and distribution.

Another parameter is temperature control. Temperature is controlled by adjusting the feed and/or mixing vessel contents temperature to within 2-3° C. of the initial starting temperature. The temperature of the mixing vessel contents may be controlled by using a jacket. Temperature excursion may cause agglomeration and undesired particle sizes.

In addition, in-line rotor stator configuration, motor and speed may be considered. These parameters provide the necessary shear to achieve the desired particle size and settling. Typically, three types of rotor stator heads are available, ranging from low, medium to high shear. Preferably, an in-line rotor stator with a medium shear head is utilized because the there is less likelihood of temperature build-up, yet a high enough level of shear is provided for smaller particle sizes.

Re-circulation rate (1 turnover after solids feed) also contributes to the operation of the process. The re-circulation rate effects particle size and settling by controlling the residence time within the in-line rotor stator. Residence time is the amount of time the mixture is in a concentrated shear zone of the in-line rotor stator and the amount of shear applied to the mixture. Long residence times, i.e., 12+ seconds, induce greater shear, thus creating heat and particle size agglomeration. Shorter residence times, i.e., 1-3 seconds, induce less shear, resulting in a larger particle size. The proper balance of residence time and rotor stator speed is required to achieve the desired particle size. In one embodiment, the optimal residence time is about 7.5 seconds at 1400 RPM.

The following examples are presented to illustrate the process of the invention. These examples are intended to aid those skilled in the art in understanding the present invention. The present invention is, however, in no way limited thereby.

EXAMPLES

Example 1

1000 kg Batch

The acrylic binder was charged to the mixing vessel followed by a rinse of deionized water. Agitation was initiated and the speed of the agitation was adjusted to avoid splashing and foaming. The defoamer was charged to the mixing vessel followed by a rinse and then the surfactant was charged to the mixing vessel followed by a rinse. The hydration inhibitor was charged to the mixing vessel followed by a rinse and then the coalescent aid was charged to the mixing vessel followed by a rinse. A thickener was added to a pre-mixed buffer solution in water and added to the mixing vessel followed by a rinse. Solids addition then began and the mixing vessel agitation was increased in multiple steps, i.e., four increases in agitation speed from the original starting agitation speed. At 50% of the solids addition, the in-line rotor stator was started. Re-circulation through the in-line rotor stator was established before solids addition resumed. After all of the solids were fed, the re-circulation rate was increased through the inline rotor stator and re-circulated during a hold period.

After the hold period, re-circulation was stopped and the in-line rotor stator was shut down. The mixture was then packed out by filtering it through 20 mesh screens.

| ingredient | parts by weight |
| --- | --- |
| alkaline binder | 21.47 |
| antifoam | 0.24 |
| surfactant | 0.39 |
| hydration inhibitor | 0.56 |
| coalescing agent | 0.16 |
| rheology modifier | 0.15 |
| excess water | 3.37 |
| gypsum | 73.67 |
| total | 100.00 |
| pH | 8.4 |
| solids | 80.36% |
| density | 1.96 |
| viscosity | 70,000-80,000 cps |

Example 2

1000 kg Batch

The acrylic binder was charged to the mixing vessel, followed by a rinse. Agitation was initiated and the speed of the agitation was adjusted to avoid splashing and foaming. The defoamer was charged to the mixing vessel, followed by a rinse. The surfactant was then charged to the mixing vessel, followed by a rinse. The thickener was dissolved in dilution water and then neutralized. The neutralized thickener was added to the mixing vessel, followed by the rinse. The activator was charged to the mixing vessel and followed by a rinse. Solids addition and the in-line rotor stator were then initiated, re-circulation was established, and the mixture was packed out as described above.

| ingredient | parts by weight |
| --- | --- |
| acidic binder | 26.94 |
| defoamer | 0.30 |
| rheology modifier | 0.065 |
| activator | 2.10 |
| filler | 66.44 |
| excess water | 3.64 |
| total | 100.00 |
| pH | 3.7 |
| solids | 80.17% |
| specific gravity | 1.82 |
| viscosity | 50,000-80,000 cps |

Example 3

4 kg Batch

Parameters:

30 minute solids feed rate 135 gm/min recirculation rate

Turnover (hold period)=4000 kg/135 gm/min=29.6 minutes

In an 8-quart stainless steel flat bottomed jacket mixing vessel equipped with a side or bottom outlet, two sets of 45 degree pitched blade turbines driven by a 0.025 hp motor capable of 0-900 RPM were provided in the mixing vessel. The impellers on the agitator shaft were set according to the following aspects ratios:

| | |
| --- | --- |
| D/T = | 0.47 |
| C/T = | 0.069 |
| S/T = | 0.415 |
| H/T = | 0.265 |

A recirculation loop was established from the side or bottom outlet port of the mixing vessel to the in-line rotor stator and back into the top of the mixing vessel. The re-circulation pump was positioned downstream of the in-line rotor stator, such that it "pulls" material off the bottom of the mixing vessel and through the in-line rotor stator. The in-line rotor stator was configured with a slotted medium shear mixing head driven by a 0.025 hp motor.

The acrylic binder was charged to the mixing vessel, followed by a rinse of deionized water. The agitation in the mixing vessel was then initiated and adjusted to give good mixing without splashing. In the following order, the defoamer, surfactant, hydration inhibitor and coalescing agent were charged to the mixing vessel, each being followed by respective rinses of deionized water.

Solids addition was then began. The mixing vessel agitation was increased at 25% of the solids feed or at t=7-8 minutes. The mixing vessel agitation was increased again at 35% of the solids feed or t=10-11 min. At 50% of the solids feed or at t=15 min, the in-line rotor stator was turned on at 1400 RPM. Re-circulation was established at 65.0 g/min.

At 75% of the solids feed or t=22-23 min, the mixing vessel agitation was increased. Re-circulation through the in-line rotor stator was increased to 135 gm/min and the solids addition continued. When the solids addition was complete at t=30 min, the batch was held for 15 minutes ("hold period") and re-circulation continued through the in-line rotor stator.

After the 15-minute hold period, the recirculation pump and then the in-line rotor stator was turned off. The batch was packed out through 20 mesh filter bags. The resulting mixture was the same as summarized in Example 1. The batch temperature increased from 21-22° C. The batch had particle sizes of 50-60 microns and 12 months of shelf stability against settling and 1-3 ppm of grits (undesired particles).

Comparative Example 4

4 kg Batch

The same process of Example 3 was used, except the in-line rotor stator speed was 3400 RPM and the recirculation rate was 65 g/min throughout the solids feed. A marked increase in batch temperature, from 23 C to 34.5° C. was observed. Particle size agglomeration resulted. The residence time for the in-line rotor stator was 12 seconds, and the particle size ranged from 225-260 microns with 10-15 ppm of grits.

Comparative Example 5

4 kg Batch

The same process of Example 3 was used, except the recirculation pump was positioned in the "push" mode, rather than the "pull" mode. A marked increase in batch temperature, from 23 C to 34.5° C. was observed across the in line rotor stator. The batch was aborted due to loss of re-circulation back into mixing vessel. Particle size agglomeration occurred and particles size ranged from 225-260 microns.

Comparative Example 6

4 kg Batch

The same process of Example 3 was used, except the in-line rotor stator was not used and the aspect ratios were:

D/T = 0.47
C/T = 0.23
S/T = 0.39
H/T = 0.65

The blade positioning affected the flow pattern, so the run was aborted due to "padding" (solids sit on top of surface and do not wet out) and loss of flow pattern.

Comparative Example 7

4 kg Batch

The same process of Example 3 was used, except the in-line rotor stator was not used and lower mixing vessel agitation speeds was used. Failure was noted by high grits and a particle size of 160 microns.

The invention claimed is:

1. A process for making a mixture comprising:
   providing a liquid component and a solids component, the solids component having a specific gravity of 2.0-3.5 having particles with a diameter of 5-50 microns, the liquid component having particles comprising from 5-65% by weight based on the weight of the liquid component and a viscosity of 10-10,000 cps;
   introducing the liquid component into a mixing vessel having a set of pitched blade turbines, having an upper and a lower pitched blade turbine the pitched blade turbines positioned inside the mixing vessel according to the ratios:

| | |
   |---|---|
   | D/T | 0.45-0.55, |
   | C/T | 0.07-0.35, |
   | S/T | 0.18-0.47, and |
   | H/T | 0.09-0.65; | adding at least 25% of the solids component into the mixing vessel;
   initiating an in-line rotor stator positioned to receive the mixture from the mixing vessel; and
   re-circulating the mixture from the mixing vessel through the in-line rotor stator and back to the mixing vessel; wherein
   D is the pitched blade turbine diameter,
   T is the mixing vessel diameter,
   C is the clearance from the mixing vessel bottom to the lower pitched blade turbine,
   H is the submergence of the upper pitched blade turbine, and
   S is the distance between the upper and lower pitched blade turbines, all in the same units of length.

2. The process of claim 1 wherein the re-circulating comprises:
   running the mixture through a pump positioned downstream of the in-line rotor stator, the pump operating in a pull mode.

3. The process of claim 1 wherein the re-circulating comprises:
   after adding 100% of the solid component, passing the entire mixing vessel contents once through the in-line rotor stator.

4. The process of claim 3 further comprising:
   terminating the re-circulation;
   removing the mixture from the mixing vessel; and
   filtering the mixture.

5. The process of claim 1 wherein the liquid component comprises a solids content of from 10-50% by weight based on the weight of the liquid component and a viscosity of 100-400 cps.

6. The process of claim 1 wherein the solids component has a specific gravity of 2.4-2.5, and particles with a diameter of 10-20 microns.

7. The process of claim 1 wherein the pitched blade turbines are positioned according to aspect rations, the aspect ratios being:

| | |
   |---|---|
   | D/T | 0.50-0.53; |
   | C/T | 0.07-0.29; |
   | S/T | 0.44-0.47; and |
   | H/T | 0.09-0.26. |

8. The process of claim 1 wherein the solids component comprises at least one of calcium sulfate hemihydrate or aluminum trihydrate particles.

9. The process of claim 1 wherein the adding comprises:
   feeding 40-60% of the solids component into the mixing vessel.

10. The process of claim 1 wherein the mixture comprises particles having a particle size of 10-300 microns and comprising from 65-85% by weight based on the weight of the mixture, the mixture having a viscosity of 10,000-200,000 cps.

* * * * *

UNITED STATES PATENT AND TRADEMARK OFFICE
CERTIFICATE OF CORRECTION

PATENT NO. : 7,637,651 B2 Page 1 of 1
APPLICATION NO. : 11/451783
DATED : December 29, 2009
INVENTOR(S) : Bush et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 836 days.

Signed and Sealed this

Ninth Day of November, 2010

David J. Kappos
*Director of the United States Patent and Trademark Office*